(No Model.)
R. G. CATHER.
BRIDLE BLINDER.
No. 468,238.  Patented Feb. 2, 1892.
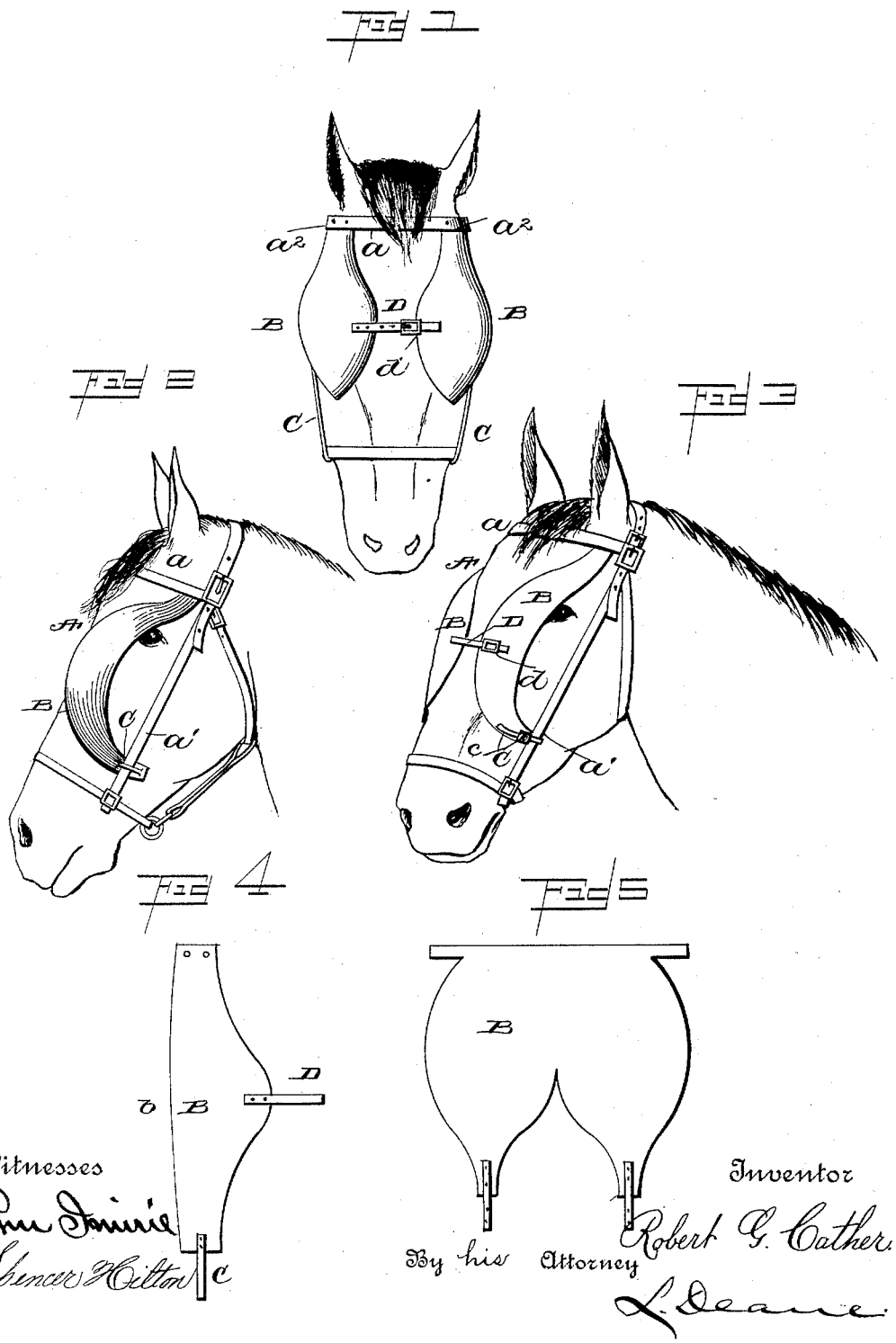

UNITED STATES PATENT OFFICE.

ROBERT G. CATHER, OF FLEMINGTON, WEST VIRGINIA.

BRIDLE-BLINDER.

SPECIFICATION forming part of Letters Patent No. 468,238, dated February 2, 1892.

Application filed August 10, 1891. Serial No. 402,269. (No model.)

*To all whom it may concern:*

Be it known that I, ROBERT G. CATHER, a citizen of the United States, residing at Flemington, in the county of Taylor and State of West Virginia, have invented certain new and useful Improvements in Blinds for Bridles or Headstalls for Cattle, Horses, Sheep, &c.; and I do hereby declare the following to be a full, clear, and exact description of the invention, such as will enable others skilled in the art to which it appertains to make and use the same.

Figure 1 is a front elevation showing this device applied to a horse's head. Fig. 2 is a side view of the same. Fig. 3 is a perspective view of the blinder or shield enlarged; Fig. 4, a detail plan of one of the blinder-pieces. Fig. 5 is a detail view showing the blinder made in one piece.

The object of this invention is to provide a blind for horses, mules, cattle, and sheep, and more particularly for the purpose of preventing them from jumping; also to prevent cows or bulls from hooking or goring; and the novelty consists in the headstall or bridle, with blinders so attached as to cover the eyes so far as the outward front vision is concerned, but yet shall allow free and perfect ventilation and admit light at the sides, bottom, and top of the blinder. My device is thus adapted to prevent the animal from seeing directly ahead, but at the same time afford every facility for sight when the animal is grazing or walking and full and complete ventilation at all times.

Heretofore attempts have been made to provide for bridles a shield or blind. These have been attached in front of the eyes or at the sides; but all of them, so far as I know, have failed to accomplish the purpose I have in view or afford protection to the eye. The sight has in some instances been cut off at the side or front; but when cut off at the latter point the means used for this purpose were objectionable in hurting the sight, as well as in interfering with grazing.

My device is very simple in construction and can readily be applied to any bridle or headstall now in use.

Referring to the accompanying drawings, A represents any sort or kind of a bridle or headstall, excepting that it has no side blinders. To the forehead-strap $a$ and cheek-straps $a'$ in the form of bridle I have used for illustration of this invention are secured so as to come directly before the animal's eyes the two front blinder-pieces B, one for each eye. As now shown, these are each rigidly secured at the upper ends by rivets $a^2$ to strap $a$ and to the cheek-straps by strap and buckle C $c$.

In making and applying these blinder-pieces B the leather is made somewhat triangular in shape, so that the nearly straight line of the base $b$ will come at the side and the part answering to the apex of the triangle about centrally over the nose of the animal. The attachment is made so as to bulge out each blinder about at the center. This structure gives a free open space before the eyes of the animal, and, except that the front sight is cut off entirely, there is no obstructure to the sight or ventilation. Thus for all purposes of walking, or grazing, or drinking, or any use the animal may be put to in driving free and unobstructed sight is permitted and there is no danger of the admission of flies or dirt to the eyes. When the blinders are applied as above to any ordinary headstall or bridle, there will be the above bulge; but by means of the strap C and buckle $c$ the lower end of the blinder B can be secured at any point along the cheek-strap. In this way each blinder can be bulged out as much or as little as may be desired. To prevent the flaring of the front edges or apices of blinder-pieces, there is secured to them the straps and buckle D $d$. Thus these edges can be drawn as near together as may be desired, and their relation to each other regulated at will.

The value of this invention will be duly appreciated by all persons having jumping horses, cattle, or stock, or fighting horned cattle.

In the mere detail of the structure of the bridle or headstall I do not propose to limit myself to any particular form, since it is only necessary to have a suitable support at the top and bottom for the blinder-pieces, so that they can be arranged and adapted as above described. In the illustration now given the bit can be attached to the metal pieces $a^2$ at the lower ends of the cheek-straps $a'$.

As indicated in Fig. 5, I may make the blinder in a single piece, and for some uses that construction would be preferable.

What I claim is—

1. The combination, with a bridle or headstall, of the blinder consisting of two parts, each rigidly and directly secured to the forehead-strap and at the lower end adjustably secured to the cheek-strap and open at the side between the points of attachment and adapted to come directly in front of the horse's eyes, substantially as described.

2. In combination with a headstall or bridle, the blinder attachment, as described, rigidly secured at the top to the forehead-strap and at the lower ends adjustably secured to the cheek-straps and open at the sides between the two points of attachment and united at the central part, all substantially as described.

In testimony whereof I affix my signature in presence of two witnesses.

ROBERT G. CATHER.

Witnesses:
FREDERICK J. BURDETT,
ABRAHAM W. BURDETT.